United States Patent
Duan et al.

(10) Patent No.: US 8,133,530 B2
(45) Date of Patent: Mar. 13, 2012

(54) ONE MAGNETIC SIDED MEDIA FOR LOW COST AND LOW CAPACITY APPLICATIONS

(75) Inventors: Shanlin Duan, Fremont, CA (US); Kenneth Johnson, Morgan Hill, CA (US); Owen Melroy, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 169 days.

(21) Appl. No.: 12/220,238

(22) Filed: Jul. 22, 2008

(65) Prior Publication Data

US 2010/0020442 A1 Jan. 28, 2010

(51) Int. Cl.
*B05D 5/12* (2006.01)
(52) U.S. Cl. .......................................... 427/130
(58) Field of Classification Search .................. None
See application file for complete search history.

(56) References Cited

U.S. PATENT DOCUMENTS

| | | | |
|---|---|---|---|
| 6,428,906 B1 * | 8/2002 | Wong et al. | 428/611 |
| 7,168,153 B2 | 1/2007 | Buitron et al. | |
| 7,267,841 B2 | 9/2007 | Kim et al. | |
| 7,322,098 B2 | 1/2008 | Buitron et al. | |
| 7,682,653 B1 * | 3/2010 | Luu et al. | 427/127 |
| 7,704,614 B2 * | 4/2010 | Lee et al. | 428/831 |
| 2004/0265638 A1 * | 12/2004 | Sexton | 428/694 T |

OTHER PUBLICATIONS

English abstract of JP 01-102719, Japan, Apr. 1989.*
Pressesky, Jason, "Toward a new paradigm for final test of magnetic media for hard disc drives," IEEE, Tran Magn, vol. 33, No. 1, Jan. 1997, pp. 962-967.*

* cited by examiner

*Primary Examiner* — Holly Rickman
(74) *Attorney, Agent, or Firm* — Darren Gold

(57) ABSTRACT

One-sided magnetic media for a hard disk drive. Methods are implemented to create a magnetic media with only one surface capable of recording data. The second surface is a non-data recording side of the media and is constructed so that it does not interfere with the recording properties of the recording side or the structural usefulness of the media. Additionally, the second surface can be a low quality surface capable of limited magnetic recording.

25 Claims, 3 Drawing Sheets

| Lubricant |
| Protective Layer(s) |
| Recording Layer(s) |
| Underlayer(s) |
| SUL |
| Adhesion Layer(s) |
| Substrate |
| Adhesion Layer(s) |
| SUL |
| Underlayer(s) |
| Recording Layer(s) |
| Protective Layer(s) |
| Lubricant |

*FIG. 4*

| Lubricant | |
| Protective Layer(s) | |
| Recording Layer(s) | |
| Underlayer(s) | ⎬ 501 |
| SUL | |
| Adhesion Layer(s) | |
| Substrate | |
| Adhesion Layer(s) | |
| Protective Layer(s) | ⎬ 502 |
| Lubricant | |

*FIG. 5*

ONE MAGNETIC SIDED MEDIA FOR LOW COST AND LOW CAPACITY APPLICATIONS

BACKGROUND OF THE INVENTION

The heart of a computer's long term memory is an assembly that is referred to as a magnetic disk drive. The magnetic disk drive includes a rotating magnetic media (disk), write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

One disadvantage to the magnetic or hard disk drive (HDD) is that they are generally manufactured in standard form factors with standard capacities. Unlike for other types of memory such as Flash or RAM, it is not trivial to create HDDs with a lower capacity from standard capacities and form factors.

Typically, media for HDDs is manufactured in a two sided format as shown in FIG. 4. The media is processed in a sputtering tool where substantially identical layers are sputtered on to both sides of the media. Thus, a two sided media, with both sides being substantially identical is created.

One method for lowering the capacity of an HDD is to turn off one media-head combination. However, such an HDD is still expensive to produce since the resources to make the media and the head are already used. Further, other companies have created special processes to put two media simultaneously into a manufacturing process as shown in FIG. 2. This allows each side of the media to be sputtered on one side. For instance, a first side 201 of a disk 204 will be sputtered, while second side 202 of disk 204 will not be sputtered because disk 203 blocks the sputtered material from reaching the second side 202 of the first disk. However, such a process requires that the sputter tools be altered to accommodate two disks being sputtered in the same sputter chamber at the same time. Further, leaving one side of a disk unsputtered creates a disk with some unfavorable materials properties. What is needed is a method of producing lower cost HDDs with favorable materials properties within current manufacturing processes.

SUMMARY OF THE INVENTION

Described are methods for manufacturing a one sided magnetic media disk. The methods create a lower cost disk with favorable materials properties. In addition, the method allows the magnetic and non-magnetic sides of the disk to be easily differentiated.

These lower cost disks are ideal for lower memory applications such as video game consoles. These applications typical need only one functional head-media combination since their memory requirements are low. The one-sided disks can also be used for applications in HDDs that are manufactured with three or some other odd number of operational heads.

The one-sided disks are less expensive to manufacture for several reasons. First, the disks use less material including precious metals such as platinum and ruthenium. Second, the one-sided disks do not need to be tested on both sides, leading to faster and less costly throughput through manufacturing.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

FIG. 4 is a schematic of a disk with substantially identical layers on both sides of a substrate.

FIG. 5 is a schematic of a disk with non-identical layers on both sides of a substrate.

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
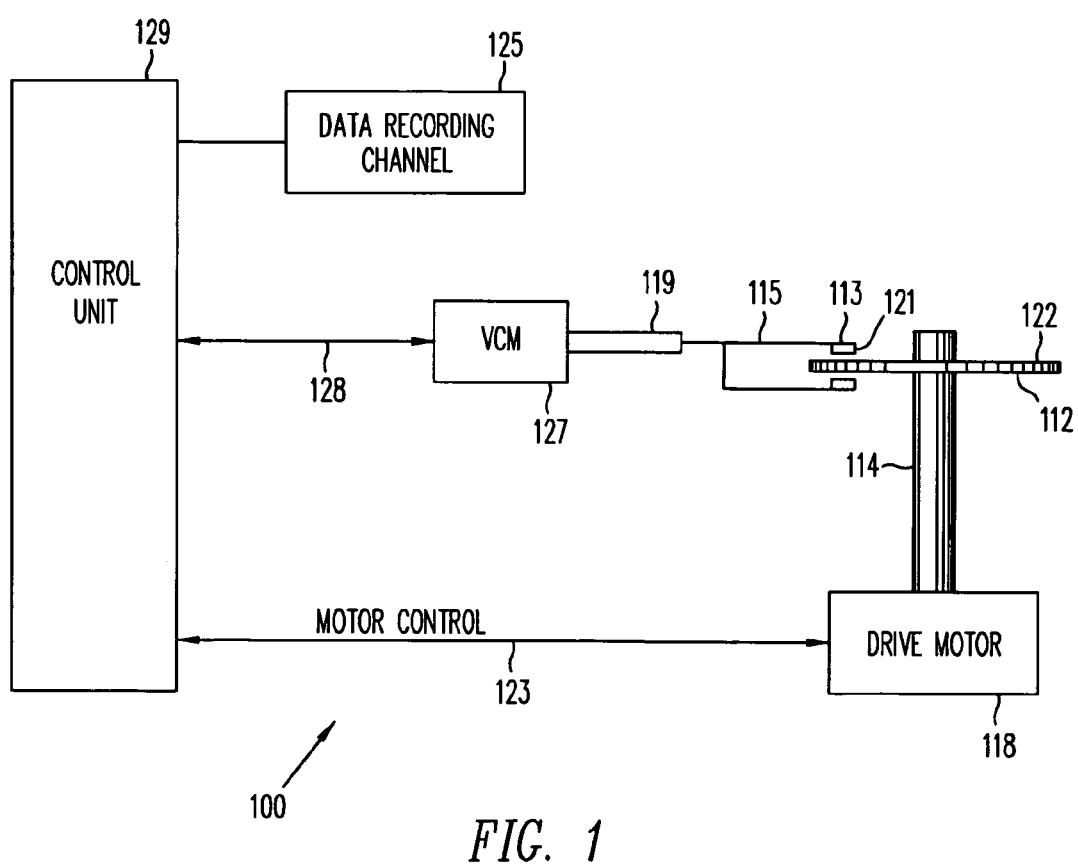
FIG. 1 is a functional schematic of an exemplary hard disk drive.
Figure 2:
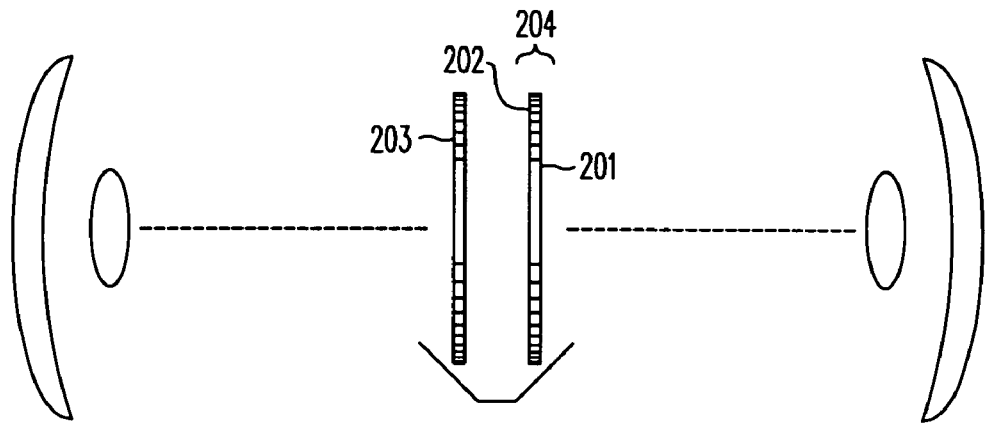
FIG. 2 is an image of a sputtering process with two disks simultaneously being sputtered.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

When a disk 112 is positioned into an HDD it is sputtered with a structure of thin films (layers) on both sides of a substrate. If the disk is placed into an HDD where only one side is used, then the sputtered materials on the non-used side of the disk are wasted. Thus, it is cost effective to not sputter every layer onto the non-used side of a disk. However, it is important to sputter some of the materials onto the non-used side of the disk, so that the overall disk has favorable properties and does not hinder performance of the HDD.

Figure 3A:
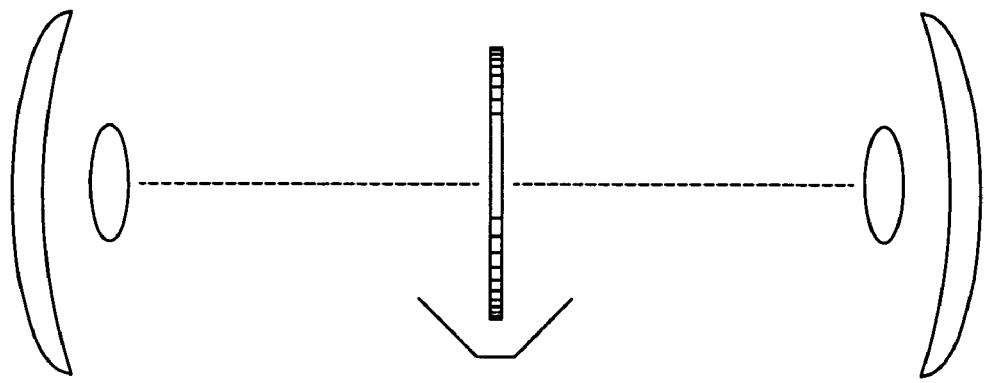
FIG. 3a is an image of a conventional sputtering process with one disk being sputtered on both sides.

Typically a disk, in this case using perpendicular technology, is designed as described in FIG. 4. A substrate is inserted into a manufacturing process with sputter chambers similar to those shown in FIG. 3a. The sputter chambers in turn sputter both sides of the substrate with various layers of materials. For a perpendicular media these layers usually include one or more adhesion layers, one or more soft underlayers as a soft underlayer structure, one or more underlayers, one of more recording layers, and one or more protective layers. In addition, lubricant is added to the disk as further protection for the disk after sputtering of the disk is completed.

These layers can be expensive and contain precious metals. For instance, the soft underlayer structures are typically quite thick. Further, the underlayers and recording layers include precious metals such as ruthenium and platinum. In addition, the soft underlayer structure typically includes ruthenium as a break layer between antiferromagnetically coupled soft underlayers.

Figure 3B:
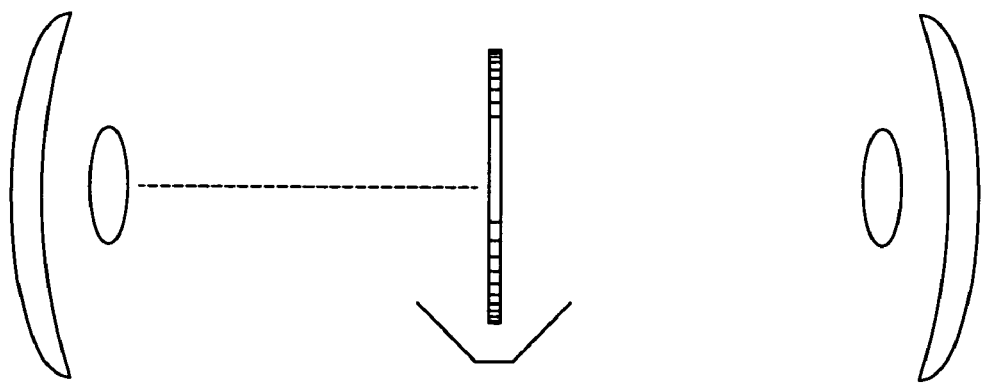
FIG. 3b is an image of a sputtering process with one disk being sputtered on only one side.

FIG. 5 shows a one sided media that is selectively sputtered. Specifically, the used magnetic side of the disk 501 is fully sputtered. However, the unused side of the disk 502 is only partially sputtered. The unused side of the disk can have some its layers made thinner or not sputtered. As will be noted in FIG. 5, the layers including ruthenium and platinum, as well as the thick soft underlayers are not sputtered on the non-used side of the disk. To not sputter a side, the sputter target on the unsputtered side is not activated as shown in FIG. 3b. Further, a thinner layer relative to the used side can be sputtered onto the non-used side of the disk by turning off one side of a sputter machine in a single sputter chamber for a limited time during the sputter process.

The adhesion layer or layers may be sputtered onto the unused side of the disk. An adhesion layer on the unused side of the disk is typically made from an inexpensive material, such as a Ti alloy (e.g. TiAl, TiCr, etc.), Cr or a Cr alloy (e.g. CrMn, CrMo, Cr oxide, etc.). An adhesion layer such as AlTi allows a protective layer to adhere to a disk better than the protective layer would otherwise. An adhesion layer such as CrTi allows a protective layer to better protect against corrosion. Further, an underlayer instead of or in conjunction with an adhesion layer may be sputtered onto the unused side of the disk.

An inexpensive sputtered layer on the unused side can also be implemented to allow for optimum media warping. Sputtered films cause stress on the films of the disk as well as the substrate. The stress within the sputtered films of the first side may create distortions or warping of the disk including the substrate. The film stress in the sputtered layer of the non-magnetic or non-used side can be used to balance and adjust the stresses to allow for a flatter disk. For example, the stress of the sputtered layer of the second side can be adjusted by film thickness, sputter pressure, and sputter power.

Optionally, a low quality recording layer may be sputtered onto the non-used side of the one-sided media disk. This low quality recording layer would be less expensive to manufacture than a high quality recording layer on the recording side of the one-sided media disk. For instance, the recording layers could be thinner or contain less platinum. Additionally, the soft underlayers could also be manufactured to be thinner than on the other side of the disk. The low quality recording layer may include a storage capacity of less than 50% of a storage capacity of the recording layer on the used side of the one-sided media. In addition, the low quality recording layer may include a storage capacity of less than 40%, 30%, 20%, 10%, 5%, 2%, 1% or even 0.5% of a storage capacity of the recording layer on the used side of the one-sided media.

A protective layer may also be formed on the disk. Protective layers are typically two layers, a layer of CHx under a layer of CNx. Adding a protective layer to the unused side of the disk protects the disk from scratching and shocks. In addition, adding the protective layer to the unused side of the disk allows both sides of the disk to have a similar surface energy. The similar surface energy keeps the later applied lubricant from preferentially migrating to one side of the disk or the other. Lastly, highly similar protective layers on each side of the disk allows for uniform flyability of a head over both sides of the disk.

In addition to sputtering the adhesion layer and the protective layer on the unused side, an additive such as a dye may be added to the sputter targets of the unused side of the disk. Such an additive may add a recognizable color or other recognizable mark to the unused side of the disk. The recognizable color or mark allows for a tester or an HDD assembler to easily determine which side of the disk is the non-used side of the disk.

As described above, the recording layer or an optimal recording layer is not sputtered onto the unused side of the disk. Since the recording layer is often sputtered in the presence of oxygen to cause the metal sputter material to oxidize, when only one side is sputtered adjustments are made to compensate for the smaller amount of metal in the chamber. In particular, the pressure of oxygen in the sputter chamber is reduced relative to the pressure typically used for sputtering a two sided media to allow for a proper amount of metal/oxygen reaction during sputtering of the magnetic recording layer. Excessive oxygen in the recording layer would lower the effectiveness of the media.

Testing of the one sided media may also be different than for two sided media. The glide testing may use test heads for only one side of disk. Secondly, the magnetic certification test may use a test head for only one side of disk.

Also, this one sided disk manufacturing process can be used for patterned or discreet track media. In these cases, not only can one side not be sputtered, but a side of the substrate may also be unpatterned.

At times, a media manufacturer receives one-sided substrates from a substrate manufacturer. These substrates often are one-sided because they have a defect on one-side of the substrate which makes that side of the substrate unusable. Thus, the process described herein is particularly useful for such substrates since the process will optimally create a disk with one usable side of the disk on the undefective side of the substrate. In addition, the process of imprinting or otherwise creating the patterns for a patterned media or discrete track media may only yield one usable side of the disk. In that case, the one sided media process would also salvage these patterned media or discrete track media and allow for their manufacture as one-sided disks.

In addition, the one-sided disk may be used with the optimal head for that model of drive. Often, the yields of up heads or down heads may be different for any given HDD model. Thus, if the higher yield head is always used, then there will be less overall scrap making one-sided HDDs in a given model of HDD with only one type of head rather than both types.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method of making a one sided media disk including the steps of:
    determining if a second side of a substrate is defective and a first side of the substrate is not defective;
    forming a high quality magnetic recording layer on only the first side of the substrate if after the step of determining, it is determined that the second side of substrate is defective and the first side of a substrate is not defective;
    forming at least one of an underlayer and an adhesion layer including CrTi on the first and the second side of the substrate; and
    forming a protective layer on the first side and the second side of the substrate after the step of forming a high quality magnetic recording layer on only the first side of the substrate.

2. The method of making a one sided media disk of claim 1, wherein the protective layer includes carbon.

3. The method of making a one sided media disk of claim 1, wherein the second side of the substrate is defective.

4. The method of making a one sided media disk of claim 1, wherein the first side of the substrate includes patterning for a patterned media application and the second side of the substrate does not include patterning for a patterned media application.

5. The method of making a one sided media disk of claim 1, wherein layers on the second side of the substrate do not include precious metals.

6. The method of making a one sided media disk of claim 1, wherein layers on the second side of the substrate do not include a soft underlayer.

7. The method of making a one sided media disk of claim 1, further including the step of performing a magnetic certification test on only the first side of the substrate.

8. The method of making a one sided media disk of claim 5, wherein layers on the second side of the substrate do not include a soft underlayer.

9. A method of making a one sided media disk including the steps of:
    determining if a second side of a substrate is defective and a first side of the substrate is not defective;
    forming a high quality magnetic recording layer on only the first side of the substrate if after the step of determining, it is determined that the second side of substrate is defective and the first side of a substrate is not defective;
    forming at least one of an underlayer and an adhesion layer including AlTi on the first and the second side of the substrate; and
    forming a protective layer on the first side and the second side of the substrate after the step of forming a high quality magnetic recording layer on only the first side of the substrate.

10. The method of making a one sided media disk of claim 9, wherein the protective layer includes carbon.

11. The method of making a one sided media disk of claim 9, wherein the second side of the substrate is defective.

12. The method of making a one sided media disk of claim 9, wherein the first side of the substrate includes patterning for a patterned media application and the second side of the substrate does not include patterning for a patterned media application.

13. The method of making a one sided media disk of claim 9, wherein layers on the second side of the substrate do not include precious metals.

14. The method of making a one sided media disk of claim 9, wherein layers on the second side of the substrate do not include a soft underlayer.

15. The method of making a one sided media disk of claim 9, further including the step of performing a magnetic certification test on only the first side of the substrate.

16. The method of making a one sided media disk of claim 13, wherein layers on the second side of the substrate do not include a soft underlayer.

17. The method of making a one sided media disk of claim 12, wherein layers on the second side of the substrate do not include precious metals.

18. The method of making a one sided media disk of claim 12, wherein layers on the second side of the substrate do not include a soft underlayer.

19. The method of making a one sided media disk of claim 12, further including the step of performing a magnetic certification test on only the first side of the substrate.

20. A method of making a one sided media disk including the steps of:
    determining if a second side of a substrate is defective and a first side of the substrate is not defective;
    forming a high quality magnetic recording layer on only the first side of the substrate if after the step of determining, it is determined that the second side of substrate is defective and the first side of a substrate is not defective and;
    forming a protective layer on the first side and the second side of the substrate after the step of forming a high quality magnetic recording layer on only the first side of the substrate,
    wherein the first side of the substrate includes patterning for a patterned media application and the second side of the substrate includes a defective pattern for a patterned media application.

21. The method of making a one sided media disk of claim 20, wherein the protective layer includes carbon.

22. The method of making a one sided media disk of claim 20, wherein the second side of the substrate is defective.

23. The method of making a one sided media disk of claim 20, wherein layers on the second side of the substrate do not include precious metals.

24. The method of making a one sided media disk of claim 20, wherein layers on the second side of the substrate do not include a soft underlayer.

25. The method of making a one sided media disk of claim 20, further including the step of performing a magnetic certification test on only the first side of the substrate.

* * * * *